United States Patent Office 3,547,613
Patented Dec. 15, 1970

3,547,613
LIQUID FERTILIZERS
Raymond Anthony Smith, Burton-upon-Trent, and John Thomas Dixon, Smethwick, England, assignors to Albright & Wilson Limited, Oldbury, near Birmingham, England, a British company
No Drawing. Filed Feb. 13, 1967, Ser. No. 615,302
Int. Cl. C05f 13/00
U.S. Cl. 71—27
11 Claims

ABSTRACT OF THE DISCLOSURE

The use of phosphonic acids of formula:

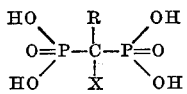

wherein R is an alkyl group containing up to 11 carbon atoms and X is an OH or $NH_2$ group, or the water soluble salts or acid hydrocarbon esters thereof, preferably 1, hydroxyethylidene diphosphonic acid as sequestering agents in the preparation of liquid fertilizers containing phosphorus, potassium and trace elements prevents the formation of precipitates therein, which it has proved infeasible to prevent with other sequestering agents.

---

The present invention relates to liquid fertilizers containing potassium and trace elements.

Liquid fertilizers containing nitrogen and phosphorus, usually in the form of ammonia, urea and $P_2O_5$ in aqueous solution, are finding increasing use. Where land has been intensively farmed it is customary to add potassium, usually as potassium chloride or sulphate, to the fertilizer. In all cases it is desirable to incorporate small amounts of certain trace elements such as manganese, copper, cobalt and molybdenum in the fertilizer. However, such trace elements give rise to precipitates when added to liquid fertilizer compositions and it has been proposed to add a complexing agent to the composition to prevent this precipitation. Where the composition does not contain potassium it has proved possible to prevent the precipitation by the addition of such complexing agents as polyphosphates. However, where the composition contains potassium it has not proved possible or commercially feasible to prevent the formation of precipitates by the use of the complexing agents hitherto proposed.

We have now found that certain phosphonic acids may be used to reduce the formation of precipitates upon addition of trace elements to liquid fertilizer composition containing both phosphorus and potassium. Whilst the phosphonic acids for present use have been disclosed as possessing sequestrant properties, it is most surprising that they should be successful in preventing the formation of precipitates in the liquid fertilizers of the invention in view of the fact that other complexing agents of a similar structure have been found to be ineffective.

Accordingly, the present invention provides a liquid fertilizer composition which comprises as nutrient ingredients potassium, phosphorus and trace elements and has also present therein a phosphonic acid of the general formula

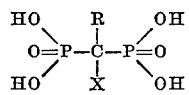

wherein R is an alkyl group containing up to 11 carbon atoms and X in an OH or $NH_2$ group, or the water soluble salts or acid hydrocarbon esters thereof.

The phosphonic acids for present use have the general formula given above. It is desirable that the R group be a lower alkyl group such as methyl, ethyl, propyl or butyl group, especially a methyl group A particularly preferred acid for present use is that wherein R is a methyl group and X is an OH group.

In place of the acids for present use there may be used the water soluble salts or acid hydrocarbon esters thereof. Preferred salts are the potassium or ammonium salts, though mixed salts of one or more cations or mixtures of salts may also be employed. The esters for present use are those possessing at least one free P—O—H group. In order to provide the esters with a satisfactory degree of water solubility it is preferred to use short chain hydrocarbon esters, such as those derived from methyl, ethyl or propyl alcohols.

The phosphonic acids for present use may be readily prepared by the reaction of phosphorus trichloride of phosphorus acid with an acylating agent and steam distilling the reaction products. An especially preferred method for the preparation of 1, hydroxyethylidene diphosphonic acid is that described and claimed in our copending application No. 505,410 now Pat. No. 3,408,935 issued Sept. 23, 1969, wherein phosphorus trichloride is reacted with an excess of glacial acetic acid and the reaction products steam distilled.

The liquid fertilizer compositions of the invention contain phosphorus and potassium as nutrient ingredients. The potassium may be provided by potassium salts such as potassium chloride, sulphate or nitrate. Potassium compounds such as potassium hydroxide may be used if their added cost is warranted. The nutrient phosphorus may be provided, as is conventional, by the use of phosphoric acid or its water soluble salts. The acid employed may be substantially pure (that is thermal) phosphoric acid or may be the impure phosphoric acid obtained by the action of a mineral acid upon phosphate rock (that is wet process phosphoric acid).

In addition to the nutrient potassium and phosphorus ingredients, the fertilizer composition may also contain other conventional fertilizer ingredients. Preferably the composition also contains appreciable amounts of nitrogenous materials. This may be achieved by the incorporation of urea, ammonia and ammonium salts, such as ammonium phosphate, or nitrate salts.

The ability of the phosphonic acids of the invention to inhibit the deposition of precipitates from the fertilizer compostions of the invention is exhbited over a wide range of pH values and the fertilizer compositions may be acid or alkaline. However, conventional liquid fertilizer compositions are usually substantially neutral.

The fertilizer compositions of the invention also contain trace element plant nutrients. These trace elements may be those commonly used, for example, salts and compounds of molybdenum, cobalt, copper, and manganese.

The relative amounts of nutrient and trace element ingredients and also the amount of water used are those commonly employed. The amount of phosphonic acid which is present in the composition will depend upon the amount of precipitable material present in the composition. Where substantially pure ingredients are employed, the precipitable material is solely the trace element ingredient. However we have found that where wet process phosphoric acid is used, the phosphonic acids for present use are also effective in inhibiting the precipitation of the materials present as impurities in wet process acid. Therefore, where wet process acid is employed in the preparation of the present fertilizer compositions, the amount of phosphonic acid employed is greater than that required to reduce precipitation of the trace elements. The precise amount of phosphonic acid which is to be added to the fertilizer composition may be readily determined by analysis of the ingredients thereof or, more preferably, by simple trial and error. Usually the amount of phosphonic acid employed, is that required to secure a precipitate-free solution. However, in some cases it may be possible to utilise liquid fertilizer compositions of the invention having a small amount of precipitated matter therein. The use of an excess amount of phosphonic acid over that required to ensure a precipitate-free composition usually leads to no advantage.

The fertilizer compositions of the invention may be prepared in known manner, for example, by mixing solutions, preferably aqueous solutions, of the nutrient ingredients and adding the trace element and phosphonic acid ingredients thereto. Whilst the phosphonic acids may be added at any point during or after the mixing of the other ingredients, for example before or after the addition of the trace elements thereto, it is preferred to add the phosphonic acids to the phosphoric acid employed in the preparation of the fertilizer composition.

The invention will now be illustrated by the following examples in which all parts are by weight.

EXAMPLE 1

Thermal phosphoric acid (92.3 parts, S.G. 1.75) was mixed with water (384 parts) containing copper sulphate pentahydrate (8 parts), manganese chloride tetrahydrate (18 parts) and 1, hydroxyethylidene diphosphonic acid (25 parts). This solution was then neutralised with ammonia (30% w./w. aqueous solution, 96 parts) to give a solution having a pH of 7. To the neutral solution were added urea (250 parts) and potassium chloride (27 parts) to give a liquid fertilizer composition containing 14% w./w. nitrogen, 6% w./w. phosphorus pentoxide and 8% w./w. potash. The fertilizer remained clear and free from solids even after storage for one year at 20° C.

By way of comparison a fertilizer composition was prepared as above, except that the 1, hydroxyethylidene diphosphonic acid was omitted. In this case a thick brown precipitate was rapidly formed when the phosphoric acid was neutralised with ammonia and the final product after addition of the potassium chloride was a brown slurry from which the solids settled gradually and was totally unsuitable for application by spraying. However, the slurry was clarified by the addition of 1, hydroxyethylidene diphosphonic acid (25 parts) thereto.

EXAMPLE 2

Copper sulphate pentahydrate (8 parts), cobalt sulphate heptahydrate (20.5 parts) and 1, hydroxyethylidene diphosphonic acid (30 parts) were dissolved in water (325 parts). The solution was then mixed with gypsum process phosphoric acid (236 parts, 29.7% w./w. $P_2O_5$). This mixture was then neutralised to a pH of 7 by the addition of 30% w./w. aqueous ammonia solution. To the neutralised solution were added urea (94 parts) and potassium chloride (174.5 parts), to give a liquid fertilizer solution containing 7% w./w. nitrogen, 7% w./w. phosphorus pentoxide and 11% w./w. potash. The solution was free from precipitates when prepared and after six months storage at 20° C. only a very slight trace of precipitate had formed.

By way of comparison a fertilizer solution was prepared as above, except that the 1, hydroxyethylidene diphosphonic acid was omitted. The product was totally unsuitable for application by spraying, but could be clarified by the subsequent addition of 1, hydroxyethylidene diphosphonic acid (30 parts).

EXAMPLE 3

Copper sulphate pentahydrate (8 parts) and cobalt sulphate heptahydrate (20.5 parts) were dissolved in water (325 parts) the solution was then mixed with gypsum process acid (120 parts, 29.7% w./w. $P_2O_5$) and a polyphosphoric acid (25 parts, 84% w./w. $P_2O_5$). The mixture was then neutralised, with cooling to a final pH of 7 by the addition of 30% w./w. aqueous ammonia solution. At this stage the solution was clear. However, upon addition of urea (94 parts) and potassium chloride (174.5 parts) to give a liquid fertilizer containing 7% w./w. nitrogen, 7% w./w. phosphorus pentoxide and 11% w./w. potash, a precipitate was formed. The amount of precipitate increased on standing for 3 days at ambient temperatures and the solution was unsuitable for application by spraying.

The addition of 1, hydroxyethylidene diphosphonic (30 parts) clarified the solution and rendered it suitable for application by spraying.

We claim:

1. A liquid fertilizer composition which comprises as nutrient ingredients potassium, phosphorus and trace elements and has also present therein a phosphonic acid of the general formula:

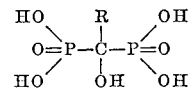

wherein R is an alkyl group containing up to 11 carbon atoms, the water soluble salts or the acid hydrocarbon esters of said phosphonic acid.

2. A liquid fertilizer composition which comprises as nutrient ingredients potassium, phosphorus and trace elements and has also present therein a phosphonic acid of the general formula:

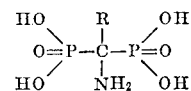

wherein R is an alkyl group containing up to 11 carbon atoms, the water soluble salts or the acid hydrocarbon esters of said phosphonic acid.

3. The composition of claim 1 wherein there is employed a water soluble potassium or ammonium salt of the phosphonic acid.

4. The composition of claim 1 wherein there is employed a water soluble acid hydrocarbon ester of the phosphonic acid.

5. The composition of claim 1 wherein R is a lower alkyl group.

6. The composition of claim 1 wherein R is a methyl group.

7. The composition of claim 1 wherein the phosphorus is provided by the use of phosphoric acid or a salt thereof.

8. The composition of claim 1 wherein the trace element is molybdenum, cobalt, copper or manganese.

9. The composition of claim 1 wherein the composition also contains nitrogenous nutrient components.

10. The composition of claim 1 wherein the phosphonic acid is present in at least sufficient amount to reduce precipitation due to the presence of both the trace elements and the impurities present in any ingredient of the composition.

11. The composition of claim 10 which has been prepared by admixing phosphoric acid, containing the desired amount of the phosphonic acid, with the other ingredients of the composition.

References Cited

UNITED STATES PATENTS 2,917,528  12/1959  Ramsey et al. _____ 71—1X

REUBEN FRIEDMAN, Primary Examiner

R. BARNES, Assistant Examiner

U.S. Cl. X.R.

71—1, 32